United States Patent
Waldron et al.

(10) Patent No.: US 9,547,400 B2
(45) Date of Patent: Jan. 17, 2017

(54) INTERFERENCE DETECTION USING FREQUENCY MODULATION

(71) Applicant: Synaptics Incorporated, San Jose, CA (US)

(72) Inventors: Matthew Waldron, Rochester, NY (US); Andrew Jabrucki, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 104 days.

(21) Appl. No.: 14/584,936

(22) Filed: Dec. 29, 2014

(65) Prior Publication Data

US 2015/0309614 A1    Oct. 29, 2015

Related U.S. Application Data

(60) Provisional application No. 61/984,591, filed on Apr. 25, 2014.

(51) Int. Cl.
*G06F 3/041* (2006.01)
*G06F 3/044* (2006.01)

(52) U.S. Cl.
CPC ............. *G06F 3/044* (2013.01); *G06F 3/0412* (2013.01)

(58) Field of Classification Search
CPC ............................... G06F 3/0412; G06F 3/044
See application file for complete search history.

(56) References Cited

U.S. PATENT DOCUMENTS

| | | |
|---|---|---|
| 2008/0157893 A1 | 7/2008 | Krah |
| 2008/0309625 A1 | 12/2008 | Krah et al. |
| 2008/0309628 A1 | 12/2008 | Krah et al. |
| 2011/0061948 A1 | 3/2011 | Krah et al. |
| 2011/0210939 A1 | 9/2011 | Reynolds et al. |
| 2011/0210940 A1* | 9/2011 | Reynolds ............ G06F 3/0418 345/174 |
| 2012/0013565 A1 | 1/2012 | Westhues et al. |
| 2012/0182229 A1 | 7/2012 | Shepelev et al. |
| 2012/0217978 A1 | 8/2012 | Shen et al. |
| 2013/0050144 A1* | 2/2013 | Reynolds ............ G06F 3/044 345/174 |

* cited by examiner

*Primary Examiner* — Kenneth Bukowski
(74) *Attorney, Agent, or Firm* — Patterson + Sheridan, LLP

(57) ABSTRACT

This disclosure generally provides embodiments to reduce the likelihood that an input device fails to detect an interfering signal when performing interference detection using interference bursts that are phase offset from sensor bursts used to perform capacitive sensing. In one embodiment, the input device adjusts the frequency of the interference bursts instead of using interference bursts with the same frequency. Doing so adjusts the phases of the interference bursts relative to each other such that even if one of the interference bursts is aligned with the interfering signal in a manner that the signal is not detected, an interference burst with a different frequency has a different alignment relative to the interfering signal. The measurements acquired by the differently aligned interference burst can be used to detect the presence of the interfering signal.

19 Claims, 5 Drawing Sheets

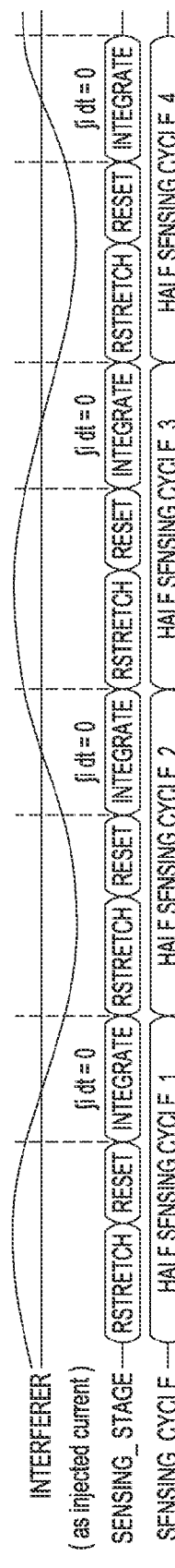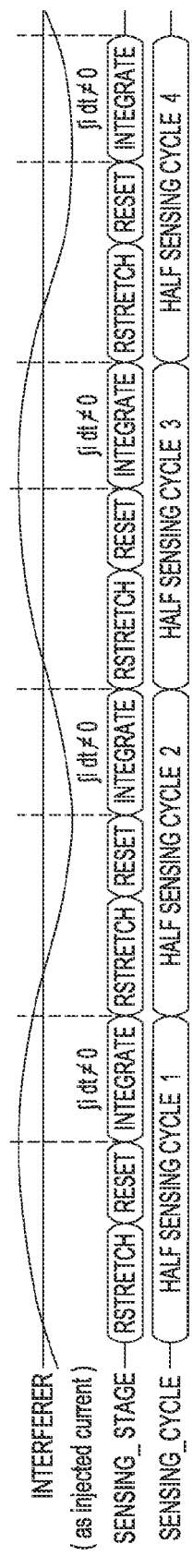
FIG. 3
FIG. 4

INTERFERENCE DETECTION USING FREQUENCY MODULATION

FIELD OF THE INVENTION

Embodiments of the present invention generally relate to electronic devices, and more specifically, to adjusting a frequency of interference bursts used to detect interfering signals.

BACKGROUND OF THE INVENTION

Display devices for updating images on a display screen are widely used in a variety of electronic systems. A typical display device includes a display source that provides display data that is used to update the screen. The display data may be organized into display frames which are transmitted from the source to the display screen at a predefined rate. In one example, each display frame corresponds to an image to be displayed on the screen. The display screen may include a display driver that updates the individual pixels on the display screen using the received display frames.

BRIEF SUMMARY OF THE INVENTION

One embodiment described herein includes a processing system that includes a sensor module having sensor module circuitry configured to couple to a plurality of sensor electrodes. The sensor module circuitry is configured to operate, during a first time period, the plurality of sensor electrodes in a capacitive sensing mode to perform capacitive sensing using a plurality of sensing bursts and operate, during a second time period, the plurality of sensor electrodes in an interference detection mode to detect interfering signals using at least first and second interference bursts where a frequency of the first interference burst is different than a frequency of the second interference burst. Moreover, the first time period and the second time period are noncontiguous time periods separated by an intermediate time period such that a phase of the plurality of sensing bursts is offset from a phase of at least one of the first and second interference bursts.

Another embodiment described herein includes an integrated circuit including capacitive means for operating, during a first time period, a plurality of sensor electrodes in a capacitive sensing mode to perform capacitive sensing using a plurality of sensing bursts and operating, during a second time period, the plurality of sensor electrodes in an interference detection mode to detect interfering signals using at least first and second interference bursts where a frequency the first interference burst is different than a frequency of the second interference burst. Moreover, the first time period and the second time period are noncontiguous time periods separated by an intermediate time period such that a phase of the plurality of sensing bursts is offset from a phase of at least one of the first and second interference bursts.

Another embodiment described herein includes a method that operates, during a first time period, a plurality of sensor electrodes in a capacitive sensing mode to perform capacitive sensing using a plurality of sensing bursts and operates, during a second time period, the plurality of sensor electrodes in an interference detection mode to detect interfering signals using at least first and second interference bursts where a frequency the first interference burst is different than a frequency of the second interference burst. Moreover, the first time period and the second time period are noncontiguous time periods separated by an intermediate time period such that a phase of the plurality of sensing bursts is offset from a phase of at least one of the first and second interference bursts.

BRIEF DESCRIPTION OF DRAWINGS

The preferred exemplary embodiment of the present invention will hereinafter be described in conjunction with the appended drawings, where like designations denote like elements, and:

FIG. 3 is a timing diagram of sensor bursts separated from interference bursts in accordance with an embodiment of the invention;

FIG. 4 is chart that illustrates the alignment of an interference burst and sensor burst relative to an interfering signal in accordance with an embodiment of the invention;

DETAILED DESCRIPTION OF THE INVENTION

Figure 1:
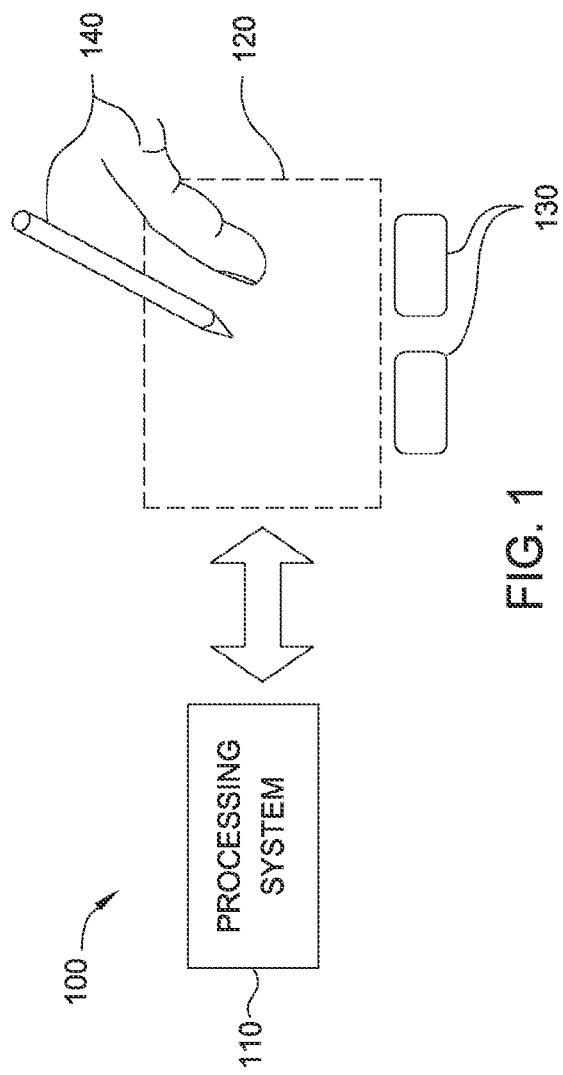
FIG. 1 is a block diagram of an exemplary system that includes an input device in accordance with an embodiment of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability. For example, a capacitive sensing input device may use a plurality of interference bursts during each capacitive sensing frame to detect interfering signals (i.e., noise). If the input device detects the interfering signal, the frequency of a capacitive sensing signal may be changed to avoid the noise. That is, the input device may change the frequency of one or more capacitive sensing signals used during a plurality of sensor bursts to a frequency that is different from the frequency of the interfering signal.

In one embodiment, the interference bursts used to perform interference detections are noncontiguous with the sensor bursts used to perform capacitive sensing. That is, an intermediate time period may separate a first time period during which the interference bursts occur from a second time period during which the sensor bursts occur. For example, the input device may drive the interference bursts onto the sensor electrodes, pause capacitive sensing in order perform a different function such as updating a display, and then resume capacitive sensing by driving the sensor bursts. However, because the interference bursts are noncontiguous with the sensor bursts, the phase of the interference bursts may be offset from the phase of the sensor bursts. Because of this phase offset, the interference bursts may not detect an interfering signal that may affect the capacitive sensing measurements acquired during the sensor bursts. In one example, the interference bursts may align with the interference signal such that the signal is not detected—i.e., the interfering signal does not affect the measurements acquired during the interference bursts. However, because of the phase offset between the bursts, the interfering signal may alter the capacitive sensing measurements acquired during the sensor bursts.

To reduce the likelihood that the input device fails to detect an interfering signal that affects the sensor bursts when performing interference detection, the input device may adjust the frequency of the interference bursts. That is, instead of using a plurality of interference bursts with the same frequency, the input device may alter the frequencies of the interference bursts. Doing so adjusts the phases of the interference bursts relative to each other such that even if one of the interference bursts is aligned with the interfering signal in a manner that the signal is not detected, an interference burst with a different frequency has a different alignment relative to the interfering signal. The input device can use the measurements acquired by the differently aligned interference burst to detect the presence of the interfering signal.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
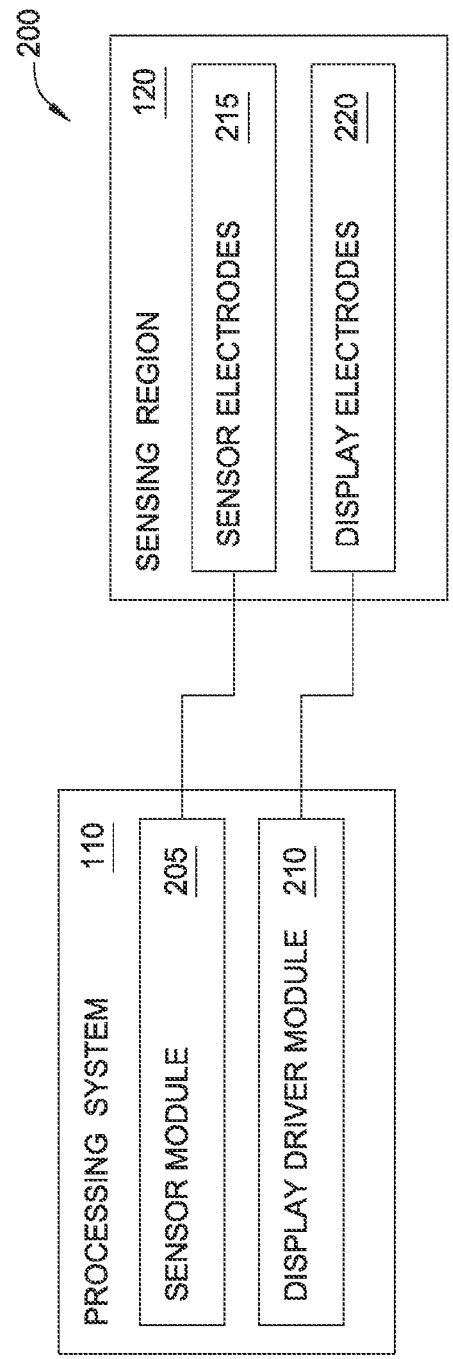
FIG. 2 is a block diagram of a processing system coupled to sensor and display electrodes in accordance with an embodiment of the invention.

FIG. 2 is a block diagram of processing system 110 coupled to sensor electrodes 215 and display electrodes 220 in accordance with an embodiment of the invention. Specifically, FIG. 2 illustrates a system 200 where processing system 110 is coupled to electrodes in the sensing region 120. The processing system 110 includes a sensor module 205 and display driver module 210. As stated above, each module may comprise circuitry that is a part of the processing system 110, firmware, software, or a combination thereof. The sensor module 205 is coupled to the sensor electrodes 215 and is used to perform capacitive sensing by driving a capacitive sensing signal onto the sensor electrodes 215 and measuring an effect caused by the capacitive sensing signal (e.g., a change in charge, current, voltage, etc.).

In one embodiment, a set of measurements from a plurality of capacitive pixels form a "capacitive image" (also "capacitive frame") representative of the capacitive couplings at the capacitive pixels. Multiple capacitive images may be acquired over multiple time periods, and differences between them used to derive information about input in the sensing region 120. For example, successive capacitive images acquired over successive periods of time can be used to track the motion(s) of one or more input objects entering, exiting, and within the sensing region 120. In one embodiment, the sensor module 205 uses sensor bursts to measure the capacitive pixels and form the capacitive image or frame. However, because interfering signals may affect the measurements acquired during the sensor bursts, the sensor module 205 uses one or more interference bursts during each capacitive frame to perform interference detection. For example, the interference bursts may be performed the beginning or end of each capacitive frame. If the sensor module 205 detects an interfering signal, the module 205 may change the frequency of the sensor bursts.

The display driver module 210 is coupled to a plurality of display electrodes 220 which are used to update display lines in a display. In one embodiment, the display driver module 210 may control when the sensor module 205 performs capacitive sensing. For example, once updated display data is received, the display driver module 210 may pause capacitive sensing performed by the sensor module 205 and update the display using the received display data. Once updated, the display driver module 210 may resume capacitive sensing. As such, the interference bursts may be separated from one or more of the sensor bursts in the same capacitive fame by a display update period.

In one embodiment, one or more of the sensor electrodes 215 include one or more display electrodes 220 used in updating the display. That is, instead of the sensor electrodes 215 being separate from the display electrodes 220 as shown, one or more display electrodes may be used to perform both capacitive sensing and display updating. In one or more embodiment, the display electrodes may comprise one or more segments of a Vcom electrode (common electrode segments or common electrodes), a source drive line, gate line, an anode electrode or cathode electrode, or any other display element. Because the display electrodes may be used both when performing capacitive sensing and when updating the display, in one embodiment, the processing system 110 may not perform capacitive sensing and display updating simultaneously.

The display electrodes may be disposed on the a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode", since it performs multiple functions. In various embodiments, each of the sensor electrodes 215 comprises one or more display electrodes. In other embodiments, at least two sensor electrodes 215 may share at least one display electrode.

FIG. 3 is a timing diagram 300 of one or more sensor bursts 305 separated from one or more interference bursts 315 in accordance with an embodiment of the invention. As shown, the timing diagram 300 includes an intermediate period 310 that separates the sensor bursts 305 from the interference bursts 315. During the intermediate period 310, the processing system may perform a different action than capacitive sensing such as display updating, finger print sensing and verification, active pen sensing, or perform a different type of capacitive sensing then the sensing performed during the sensor bursts 305 (e.g., absolute capacitive sensing versus transcapacitive capacitive sensing). Although display updating is specifically contemplated, the present embodiments may apply to any activity that is performed during the intermediate period 310 which separates an interference burst 315 from a sensor burst 305.

Furthermore, although timing diagram 300 illustrates the sensor bursts 315 separated from the interference bursts 315, in one embodiment, one or more of the sensor bursts 305 may be performed sequentially with the interference bursts 315. For example, the processing system may perform a plurality of sensor bursts 305 then pause capacitive sensing during the intermediate period 310 to perform display updating. The processing system may then resume capacitive sensing and complete the remaining sensor bursts in a capacitive frame along with the interference bursts 315. In this case, the interference bursts 315 are contiguous with some of the sensor bursts in the capacitive frame but not others. However, the embodiments herein are not limited to phase misalignments between interference and sensor bursts that are separated by an intermediate time period but may apply to embodiments where the interference and sensor bursts are contiguous but nonetheless out of phase.

FIG. 4 is chart 400 that illustrates the alignment of an interference burst 405 and sensor burst 410 relative to an interfering signal in accordance with an embodiment of the invention. The top half of chart 400 illustrates the alignment between an interfering signal (shown as a sine wave) and interference burst 405 while the bottom half of chart 400 illustrates the alignment between the interfering signal and sensor burst 410. Both interference burst 405 and sensor burst 410 include at least three stages: a stretch stage, reset stage, and integrate stage. In one embodiment, during the stretch stage, a receiver in the sensor module is disconnected from the sensor electrode. Moreover, during this stage, the receiver may also be disconnected from the demodulator which accumulates a charge caused by the interfering signal or capacitive sensing signals. During the reset stage, the voltage of the receiver is reset to a default voltage, and during the integrate stage, the receiver measures an effect caused by an interfering signal.

Although not shown in chart 400, in other embodiments, another stretch stage may be immediately after the reset stage. The RSTRETCH stage and the stretch stage after the reset stage may be independently controlled to be coupled (or not coupled) to the sensor module during their respective time periods. Moreover, these stages can also extend the reset stage by forcing a feedback switch closed during their respective time periods.

In one embodiment, the processing system uses the effect measured by the sensor module during interference burst 405 to select a digital value and derive an interference metric. The processing system compares the interference metric to a noise threshold and determines whether to change the frequency of the capacitive sensing signal driven onto the sensor electrodes during the sensor bursts. Furthermore, during interference burst 405, the sensor module may not be driving any capacitive sensing signals onto the sensor electrodes. That is, the sensor module measures the effect caused by other signals (e.g., interfering signals) but not the capacitive sensing signals. In contrast, during sensor burst 410, the sensor module drives one or more capacitive sensing signals onto the sensor electrodes and measures the effect caused by these signals on one or more sensor electrodes.

The three stages in the bursts 405 and 410 are combined to form a plurality of half sensing cycles. The interference burst 405 and sensor burst 410 may include any number of half sensing cycles which varies depending on the particular implementation of the input device. In some embodiments, each interference or sensor burst may include between five and one hundred half sensing cycles. The measurements acquired during the integrate stages of each of the half sensing cycles may be averaged when deriving the interference metric or the capacitive sensing measurements.

As shown in the top half of timing diagram 400, the integrate stages for interference burst 405 align with the interfering signal such that the effect measured during each of the integrate stages is zero—i.e., $\int i \, dt = 0$. Stated differently, whatever charge effect caused by the interfering signal during the first half of the integrate stages is removed during the second half, and thus, the overall effect is zero. As such, the sensor module does not detect the interfering signal.

However, if sensor bursts have the same phase as the interference burst 405, the interfering signal will also not affect the measurement acquired during these bursts. That is, because the sensor bursts also have the same three stages as the interference bursts and are phase aligned with the interference burst 405, the integrate stages of the sensor bursts will similarly align with the interfering signal such that the net effect introduced by the interfering signal is zero. Therefore, the interfering signal does not affect the capacitive sensing measurement acquired during the sensor bursts. Typically, when the interference bursts are contiguous with the sensor bursts, a delay can be controlled such that the interference bursts are phase aligned with the sensor bursts. Thus, even if there is an interfering signal at the same frequency as the frequency of the interference and sensor bursts, if the interference bursts do not detect the interfering signal because they are aligned as shown by interference burst 405, the interfering signal will also not affect the measurements acquired during the sensor bursts.

However, sensor burst 410 in the lower half of chart 400 is out of phase with interference burst 405. For example, referring back to FIG. 3, there may be an intermediate time period between the sensor burst 410 and the interference burst 405 which causes the phase offset. Because of this offset, the interfering signal does affect the measurement acquired during the integrate stage of sensor burst 410 even though this signal does not affect the measurement acquired during the integrate stage of interference burst 405. As shown in chart 400, the effect introduced by the interfering signal is non-zero—i.e., $\int i \, dt \neq 0$—and thus affects the measurement acquired by the sensor module. Because the sensor module measures the effect introduced by both the capacitive sensing signal being driven onto the sensor electrodes as well as the interfering signal, the sensor module may output an erroneous result—e.g., determine that an input object is proximate to the sensing region when it is not, or determine that an input object is not proximate to the sensing region when it is. As shown by the example in FIG. 4, when an interference burst is out of phase with a sensor burst, an interfering signal may not affect the measurements acquired during the interference burst but does affect the measurements acquired during the sensor burst.

Figure 5:
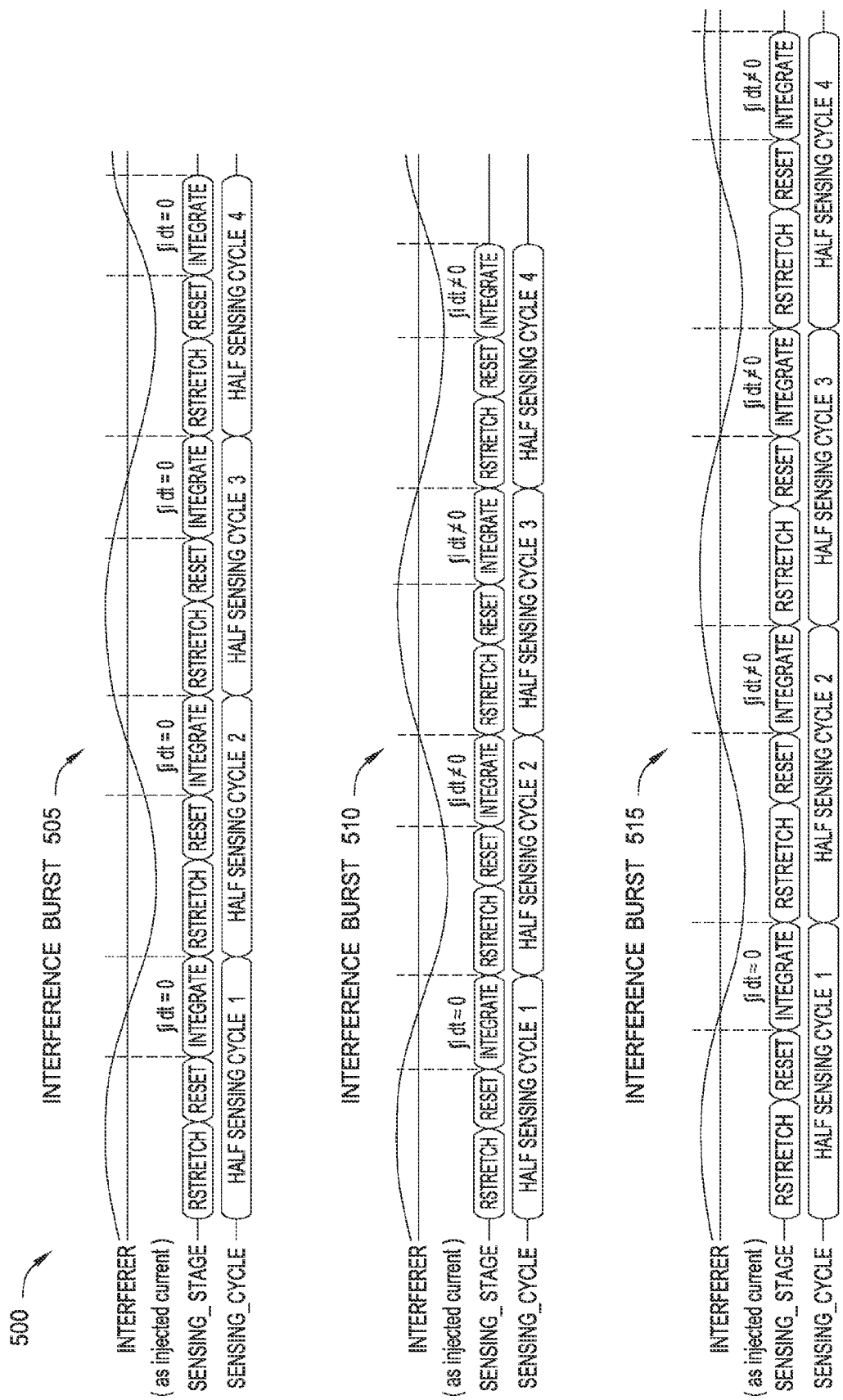
FIG. 5 is a chart of three interference bursts at three different frequencies in accordance with an embodiment of the invention.

FIG. 5 is a chart 500 of three interference bursts at three different frequencies in accordance with an embodiment of the invention. Instead of performing interference detection in a capacitive frame using a plurality of sequential interference bursts with the same frequency, chart 500 illustrates three interference bursts with different frequencies (i.e., different durations or lengths of the half sensing cycles). In one embodiment, interference bursts 505, 510, and 515 may be sequential, contiguous bursts. Because the frequencies of the bursts change, so does their alignment with the interfering signal (again shown here as a sine wave). For interference burst 505, the integrate stage aligns with the interference signal in a similar manner as interference burst 405 in FIG. 4, and thus, there is no (or very little) effect cased by the interference signal measured by the sensor module during this stage. Because the frequency of the interfering signal is the same or very similar to the frequency of interference bursts 505, each of the integrate stages measure substantially no effect resulting from the interference signal. Based on these measurements, the sensor module may be unable to detect the presence of the interfering signal.

However, interference burst 510 (which may be contiguous with interference burst 505) has a different frequency from both interference burst 505 and the interfering signal. Specifically, the length of the half sensing cycles has been decreased for interference burst 510 relative to 505 thereby increasing its frequency. This change in frequency results in the integrate stages of burst 510 aligning differently with the interfering signal. For example, in the leftmost integrate stage of interference burst 510, the sensor module measures substantially no effect resulting from the interfering signal—i.e., $\int i\, dt \approx 0$. However, during the other three integrate stages, the sensor module does measure an appreciable effect caused by the interfering signal that indicates its existence.

Interference burst 515 (which may be contiguous with burst 505 or burst 515) also has a different frequency from both interference bursts 505 and the interfering signal. Here, the length of the half sensing cycles has been increased relative to interference burst 505 thereby decreasing its frequency. Like with interference burst 510, during the leftmost integrate stage the sensor module measures substantially no effect while during the other three integrate stages the module does measure an effect caused by the interfering signal.

Based on the measurements acquired during the interference bursts 505, 510, and 515, the processing system may determine whether or not to change the frequency of the capacitive sensing signals used during the sensor bursts. If, for example, the processing system identifies an interfering signal during any one of the interference bursts, the system may change the frequency of the capacitive sensing signals driven during the sensing cycles. Stated differently, sensing cycles (and bursts) with different frequencies may be used to determine whether there is any interfering signal within a range of frequencies (e.g., a passband). If any interfering signals are detected in this range, the processing system adjusts the frequency of the capacitive sensing signals. Although chart 500 illustrates using three interference bursts with sensing cycles at different frequencies, more or less than this number may be used. For example, each capacitive frame may include only two contiguous interference bursts or may include four or more contiguous interference bursts that each have different frequencies.

In one embodiment, the frequency change between the interference bursts may range from 0.1% to 10% relative to a baseline frequency which may be the same frequency as the sensor burst. For example, if interference burst 505 has half sensing cycles with the same length as the half sensing cycles in the sensor bursts, the frequency of the half sensing cycles in interference burst 510 may be 1% faster, while the half sensing cycles in interference burst 515 may be 1% slower than the frequency of the half sensing cycles in interference burst 505. Of course, the processing system may also include other interference bursts with additional incremental changes in frequency—e.g., an interference burst with a 2% slower/faster frequency than the baseline frequency. The incremental changes of frequency of the different interference bursts may be linear (e.g., 1%, 2%, 3%, etc.), exponential (e.g., 1%, 2%, 4%, etc.), or ad hoc. Moreover, the interference bursts may be arranged in any manner. For example, the bursts may be ordered such that burst 505 is first, burst 510 is second, and burst 515 is third. Or the interference bursts may be ordered such that burst 510 is first, burst 505 is second, and burst 515 is third.

To change the duration or length of the half sensing cycles, in chart 500 the duration of the stretch stage is adjusted while the timings of the reset and integrate stage are unchanged. In some embodiments, it may be preferred to change the timing of the stretch stage rather than the reset or integrate stages because shortening these stages may result in one or more signals having less time to settle. However, in other embodiments, the durations of the reset or integrate stage may be adjusted to change the frequency of the interference bursts. Further still, the processing system may change the durations of multiple stages in order to change the frequency of the half sensing cycles in an interference burst (e.g., shorten/increase the duration of both the stretch and reset stages).

As shown in chart 500, changing the frequencies of the interference bursts used to perform interference detection reduces the likelihood that a phase offset between the interference bursts and the sensor bursts will result in failing to detect an interfering signal using the interference bursts that affects the sensor bursts.

Figure 6:
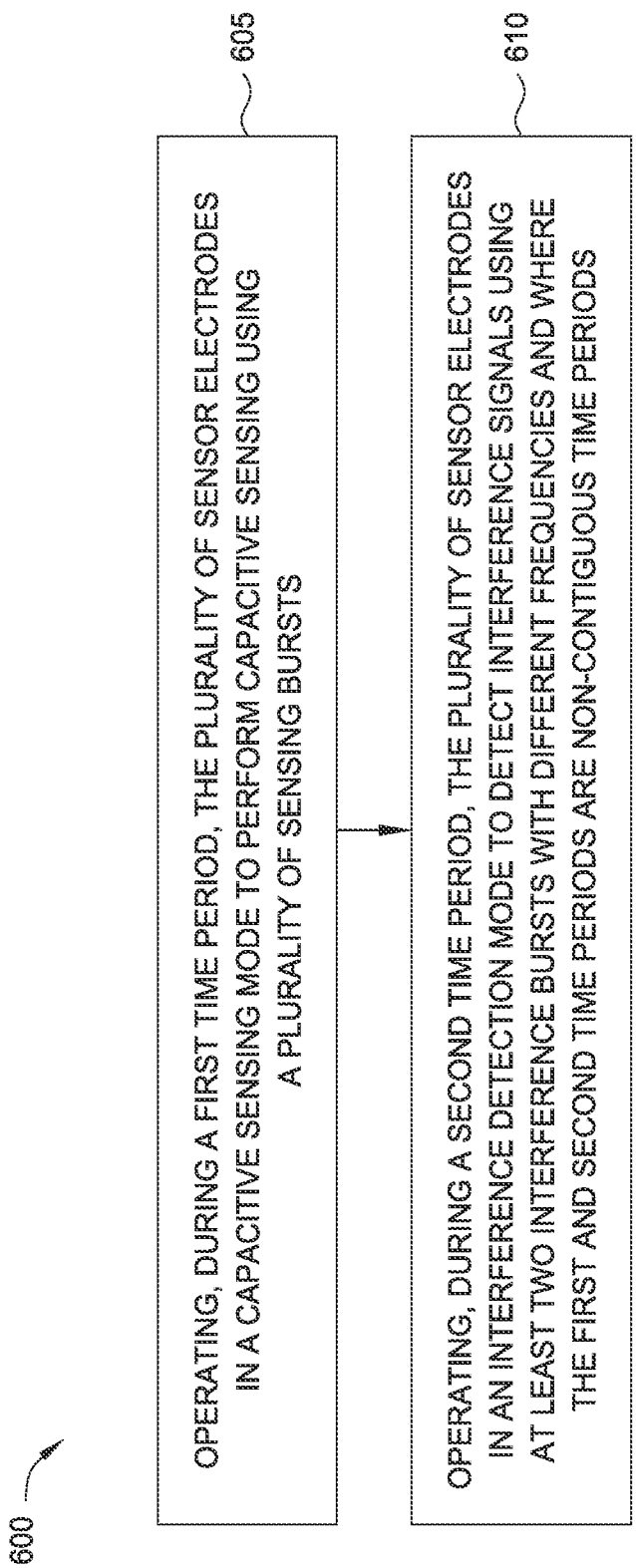
FIG. 6 is a method for detecting an interfering signal in accordance with an embodiment of the invention.

FIG. 6 is a method 600 for detecting an interfering signal in accordance with an embodiment of the invention. At block 605, the processing system operates, during a first time period, a plurality of sensor electrodes in a capacitive sensing mode to perform capacitive sensing using a plurality of sensing bursts. A non-limiting example of a suitable sensor burst 410 is shown in FIG. 4. During the integrate stages, the sensor module in the processing system measures an effect resulting from driving one or more capacitive signals onto at least one sensor electrode. Additionally, chart 400 illustrates that an interfering signal with a similar frequency as the sensor burst 410 (e.g., within a non-filtered passband) may affect the measurements acquired during the integrate stages.

To detect and avoid interfering signals that may be similar to the frequency of the capacitive sensing signals, at block 610, the processing system operates, during a second time period, the plurality of sensor electrodes in an interference detection mode to detect the interfering signals using at least two interference bursts. In one embodiment, the phase of at least one interference burst is misaligned with the phase of at least one sensor burst.

Furthermore, a system in the processing system different than the capacitive sensing system may set when the first and second time periods occur. In one embodiment, the display system in the processing system may instruct the capacitive sensing system when capacitive sensing is performed (i.e., when the sensor bursts occur) and when the interference detection is performed (i.e., when the interference bursts occur). For example, the display system may permit the capacitive sensing system (e.g., the sensor module) to perform capacitive sensing using the sensor bursts but then pause this process in response to receiving updated display data. Moreover, the processing system may be unable to perform capacitive sensing and display updating simultaneously because one processes may introduce noise into the other processes, or because the two processes may both use shared electrodes (e.g., share display electrodes). Once the display update is performed, the display system may again permit the capacitive sensing system to resume capacitive sensing and/or begin interference detection. Because the capacitive sensing system may not control when these time periods for capacitive sensing and interference detection occur, the phases between the sensor bursts and interference bursts may be offset or misaligned which may result in the situation illustrated in FIG. 4.

To reduce the likelihood an interfering signal is not detected, the processing system adjusts the frequency of the interference bursts such that at least two of the bursts have different frequencies. By doing so, the processing system is more likely to measure an effect caused by the interfering signal during at least one of the interference bursts. For example, the processing system may change the frequency of the sensing cycles in the interference bursts by changing the duration or one or more stages in the cycles. Thus, even if one of the interference bursts does not measure an effect resulting from the interfering signal, the other interference bursts is likely to measure an effect, and thus, alert the processing system of the existence of the interfering signal.

Figure 7:
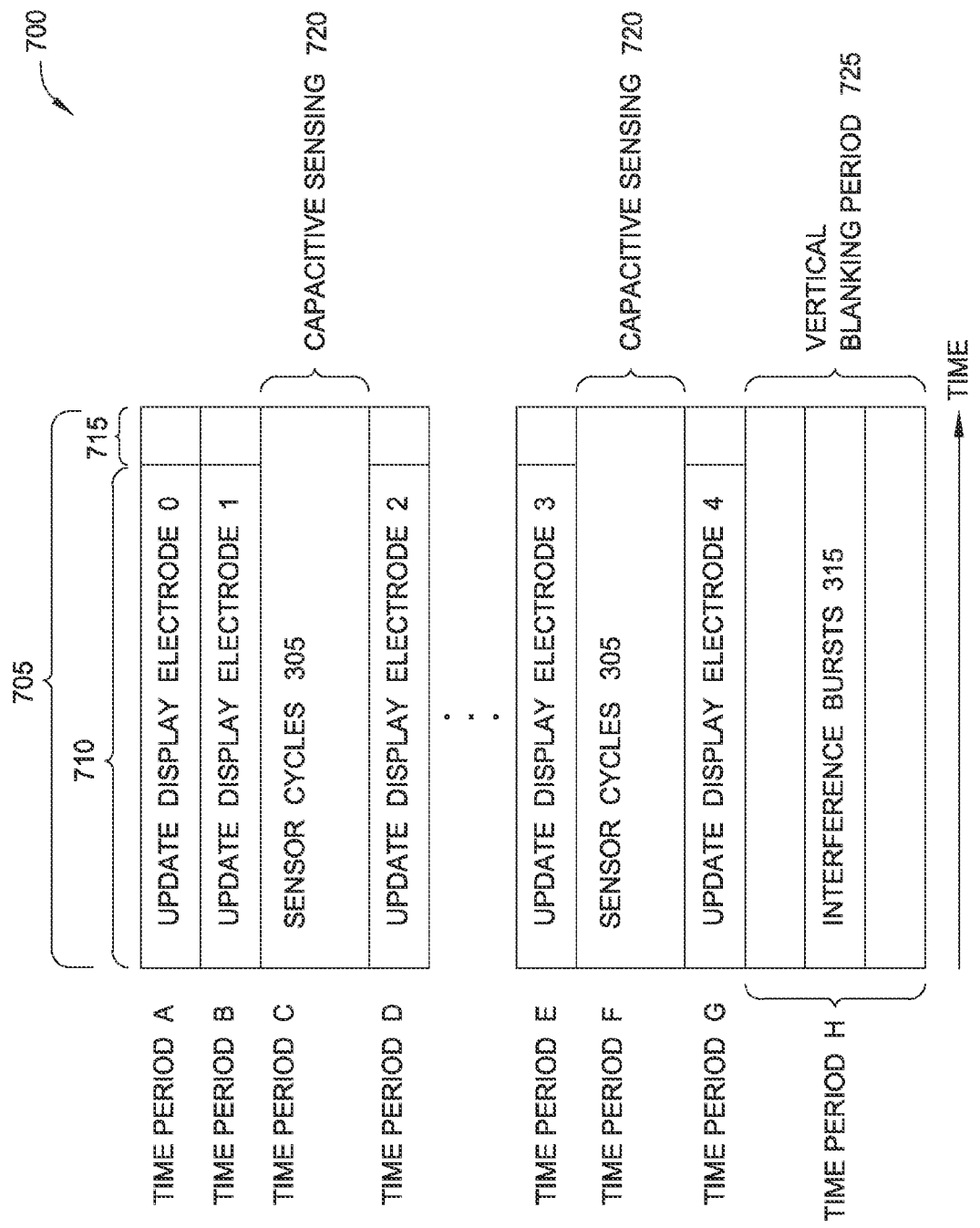
FIG. 7 is a timing chart for processing a display frame with interleaved capacitive sensing periods in accordance with an embodiment of the invention.

FIG. 7 is a timing diagram 700 for processing a display frame with interleaved capacitive sensing periods in accordance with an embodiment of the invention. Specifically, the timing diagram 700 illustrates the different time periods in a display frame. Time periods A, B, D, E, and G each represent the time used to update a single display line of a display screen in the input device. This display line update time is further divided into a pixel update period 710 used to update the pixels of the display line and a buffer time 715 that occurs between each display line update 705. The buffer time 715 may be also referred to as a horizontal blanking period. The driver module may use buffer time 715 to, for example, retrieve data needed to update the next display line, drive a voltage onto the display electrode(s) corresponding to the display line, or allow signals to settle to reduce interference when updating subsequent display lines. Nonetheless, the embodiments disclosed herein are not limited to an input device with buffer time 715 and may be used in a system where there is no buffer time between the pixel update period 710 and the next display line update 705. In various embodiments, the buffer time 715 is reduced in length such that it is substantially non-existent.

Moreover, the display electrodes 0-4 may be driven for display updating in any order. For example, the driver module may update a display line at the top of the display screen, and in the subsequent display line update 705, update a display line at the bottom of the screen. As a result, the input device may sequentially drive two display electrodes that are not located sequentially in the display screen. Further still, a display frame may not update each display line of the display screen if, for example, only a portion of the display screen is actively displaying information. Thus, the common electrodes 0-4 in diagram 700 may represent only a portion of the common electrodes in the input device.

In one embodiment time periods C and F each represent times for performing capacitive sensing, or capacitive sensing periods. Time periods C and F maybe at least as long as the time to update a single line of the display screen. In another embodiment, time period C and F are longer than the time to update a single line of a display screen. Moreover, the input device may use the same common electrodes used to update the pixels of the display screen to drive capacitive sensing signals.

In one embodiment, after updating display lines during time periods A and B, the driver module may pause display updating and use time period C to perform capacitive sensing. During this time period, the driver module may not update any of the pixels in the display screen. Additionally, the driver module may drive capacitive sensing signals on at least one sensor electrode in the display screen. Based on the resulting signals received, which include effects corresponding to the capacitive sensing signals, the input device derives positional information of an input object proximate to a sensing region of the device.

In one embodiment, the driver module performs capacitive sensing during a plurality of consecutive buffer time periods 715, for example, during the buffer time periods 715 for time periods A and B. During each buffer time period 715, only a portion of the information needed to acquire the capacitive measurement may be captured. The buffer time periods 715 may be too short for the input device to derive an accurate capacitive measurement for a particular transmitting electrode. However, after a performing capacitive sensing during a plurality of buffer time periods 715, the input device may derive an accurate measurement of the change in capacitive coupling for a selected sensor electrode or electrodes.

Alternatively or additionally, the driver update module may pause updating the display in order to perform capacitance sensing. As shown in diagram 700, the driver update module updates the pixels associated with common electrodes 0 and 1 during time periods A and B. However, at time period C, display updating is paused (i.e., the driver module does not continue to update the next display line in the frame) while capacitive sensing is performed. Specifically, the capacitive sensing periods 720 are interleaved with the display line updates of the display frame. Accordingly, the capacitive sensing period may also be referred to as an in-frame blanking period, a long horizontal blanking period, or a long h-blank period where display updating is paused while the driver module performs capacitive sensing. The driver module resumes display updating for the same display frame after the capacitive sensing period 720 is finished. In one embodiment, the capacitive sensing periods 720 are longer than the buffer time periods 715 and, in some embodiments, are at least as long as the pixel update period 710 or the display line update 705. In various embodiments, the capacitive sensing period 720 may be longer than a display line update 705. However, the duration of the capacitive sensing periods 720 may be adjusted according to the particular design of the input device. In addition to performing capacitive sensing during period 720, in one embodiment the driver module also performs capacitive sensing during one or more buffer time periods 715 of the display line updates 705.

The vertical blanking period 725 is the period between the last display line update period of a display frame and the beginning of a row update period in a subsequent display frame. Although not shown in FIG. 7, the timing diagram 700 may also include a second vertical blanking period at the beginning of updating a display based on a received display frame—i.e., before time period A. Because the input device does not update the display during these vertical blanking periods, in some embodiments, the driver module may also use either the first or the second vertical blanking periods (or both) to perform capacitance sensing. As shown here, the input device performs interference detection during the vertical blanking period 725. For example, the sensor module uses a plurality of interference bursts 315 to determine whether an interfering signal is present. As discussed above, at least two of the interference bursts 315 have different frequencies. For example, two of the bursts 315 may have the same frequency while another two of the bursts have a different frequency, or all four of the bursts 315 may have a different respective frequency.

In one embodiment, at least two of the interference bursts 315 are contiguous. However, the capacitive frame may also include other interference bursts that are noncontiguous with the interference bursts 315 occurring during the vertical blanking period 725—e.g., other interference bursts may be performed during the capacitive sensing period 720 at Time Period F. Additionally, although diagram 700 illustrates that the interference bursts 315 are noncontiguous with the sensor bursts 305 performed in the capacitive sensing periods 720, in one embodiment, one or more sensor bursts may be performed in the vertical blanking period 725 and be contiguous with the interference bursts 315.

Furthermore, the interference bursts 315 may occur at other time periods within the display frame. For example, the bursts may be performed in one of the h-blank time periods (e.g., Time Period C or F) or during a separate h-blank time period during which only interference detection occurs. Furthermore, the interference bursts 315 may occur in a blanking period occurring at the beginning as well as during the vertical blanking period 725.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

We claim:

1. A processing system, comprising:
   a sensor module having sensor module circuitry configured to couple to a plurality of sensor electrodes, the sensor module circuitry is configured to:
      operate, during a first time period, the plurality of sensor electrodes in a capacitive sensing mode to perform capacitive sensing using a plurality of sensing bursts,
      operate, during a second time period, the plurality of sensor electrodes in an interference detection mode to detect interfering signals using at least first and second interference bursts, wherein a frequency of the first interference burst is different than a frequency of the second interference burst, and
      wherein the first time period and the second time period are non-contiguous time periods separated by an intermediate time period such that a phase of the plurality of sensing bursts is offset from a phase of at least one of the first and second interference bursts, and
      wherein each of the first and second interference bursts comprises a reset stage, an integrate stage, and a third stage, wherein the sensor module circuitry is configured to adjust lengths of the third stages in order to set the frequencies of the first and second interference bursts.

2. The processing system of claim 1, wherein, when in the capacitive sensing mode, the sensor module circuitry is configured to operate the plurality of sensor electrodes such that the plurality of sensing bursts occur sequentially in the first time period and, when in the interference detection mode, the sensor module circuitry is configured to operate the plurality of sensor electrodes such that the first and second interference bursts occur sequentially in the second time period.

3. The processing system of claim 1, further comprising: a display driver module configured to drive a plurality of display electrodes to update a display line of a display during the intermediate time period.

4. The processing system of claim 3, wherein the display driver module is configured to pause capacitive sensing and interference detection during the intermediate time period.

5. The processing system of claim 3, wherein the sensor module circuitry is configured to use at least one common electrode to perform capacitive sensing during the first time period and the display driver module is configured to use the at least one common electrode to update the display line during the intermediate time period.

6. The processing system of claim 1, wherein the sensor module circuitry is configured to control the first and second interference bursts such that each burst comprises:
   a plurality of sensing cycles, wherein the frequencies of the first and second interference bursts are set based on a length of the plurality of sensing cycles.

7. The processing system of claim 1, wherein the sensor module circuitry is configured operate the plurality of sensor electrodes during the first time period and operate the plurality of sensor electrodes during the second time period as part of a same capacitive sensing frame.

8. An integrated circuit, comprising:
   a processing system configured to:
      operate, during a first time period, a plurality of sensor electrodes in a capacitive sensing mode to perform capacitive sensing using a plurality of sensing bursts,
      operate, during a second time period, the plurality of sensor electrodes in an interference detection mode to detect interfering signals using at least first and second interference bursts, wherein a frequency of the first interference burst is different than a frequency of the second interference burst, and
      wherein the first time period and the second time period are non-contiguous time periods separated by an intermediate time period such that a phase of the plurality of sensing bursts is offset from a phase of at least one of the first and second interference bursts, and
      wherein the first and second interference bursts each comprises a reset stage, an integrate stage, and a third stage, wherein the processing system is configured to adjust lengths of the third stages in order to set the frequencies of the first and second interference bursts.

9. The integrated circuit of claim 8, wherein, when in the capacitive sensing mode, the processing system operates the plurality of sensor electrodes such that the plurality of sensing bursts occur sequentially in the first time period and, when in the interference detection mode, the processing system operates the plurality of sensor electrodes such that the first and second interference bursts occur sequentially in the second time period.

10. The integrated circuit of claim 8, further comprising display updating means for driving a plurality of display electrodes to update a display line of a display during the intermediate time period.

11. The integrated circuit of claim 10, wherein the display updating means pauses capacitive sensing and interference detection during the intermediate time period.

12. The integrated circuit of claim 11, wherein the processing system uses at least one common electrode to perform capacitive sensing during the first time period and the display updating means uses the at least one common electrode to update the display line during the intermediate time period.

13. The integrated circuit of claim 8, wherein the processing system controls the first and second interference bursts such that each burst comprises:
   a plurality of sensing cycles, wherein the frequencies of the first and second interference bursts are set based on a length of the plurality of sensing cycles.

14. A method, comprising:
   operating, during a first time period, a plurality of sensor electrodes in a capacitive sensing mode to perform capacitive sensing using a plurality of sensing bursts;
   operating, during a second time period, the plurality of sensor electrodes in an interference detection mode to detect interfering signals using at least first and second interference bursts, wherein a frequency of the first interference burst is different than a frequency of the second interference burst and each of the first and second interference bursts comprises a reset stage, an integrate stage, and a third stage;
   adjusting lengths of the third stages of the first and second interference bursts in order to set the frequencies of the first and second interference bursts, wherein the first time period and the second time period are non-contiguous time periods separated by an intermediate time period such that a phase of the plurality of sensing bursts is offset from a phase of at least one of the first and second interference bursts.

15. The method of claim 14, wherein the plurality of sensing cycles occur sequentially in the first time period and the first and second interference bursts occur sequentially in the second time period.

16. The method of claim 14, further comprising:
driving a plurality of display electrodes to update a display line of a display during the intermediate time period.

17. The method of claim 16, wherein capacitive sensing and interference detection are paused during the intermediate time period.

18. The method of claim 16, wherein the plurality of sensor electrodes comprises at least one common electrode that is configured to perform capacitive sensing during the first time period and update the display line during the intermediate time period.

19. The method of claim 14, wherein the first and second interference bursts each comprises a plurality of sensing cycles, wherein the frequencies of the first and second interference bursts are set based on an individual length of the plurality of sensing cycles.

* * * * *